US010960988B2

(12) United States Patent
Walker (10) Patent No.: US 10,960,988 B2
(45) Date of Patent: Mar. 30, 2021

(54) DELIVERY LANDING PADS FOR UNMANNED AERIAL VEHICLES (UAVS)

(71) Applicant: The Boeing Company, Chicago, IL (US)

(72) Inventor: James Kendall Walker, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 16/036,488

(22) Filed: Jul. 16, 2018

(65) Prior Publication Data
US 2020/0017237 A1   Jan. 16, 2020

(51) Int. Cl.
| B64F 1/00 | (2006.01) |
| G01G 19/07 | (2006.01) |
| G06Q 10/08 | (2012.01) |
| G08G 5/00 | (2006.01) |
| G01G 19/00 | (2006.01) |
| B64F 1/02 | (2006.01) |
| B64F 1/36 | (2017.01) |
| H02S 20/26 | (2014.01) |
| H02S 40/38 | (2014.01) |
| B64D 45/04 | (2006.01) |

(52) U.S. Cl.
CPC ............. *B64F 1/007* (2013.01); *B64D 45/04* (2013.01); *B64F 1/02* (2013.01); *B64F 1/362* (2013.01); *G01G 19/002* (2013.01); *G01G 19/07* (2013.01); *G06Q 10/0833* (2013.01); *G08G 5/0026* (2013.01); *G08G 5/0069* (2013.01); *H02S 20/26* (2014.12); *H02S 40/38* (2014.12)

(58) Field of Classification Search
None
See application file for complete search history.

(56) References Cited

U.S. PATENT DOCUMENTS

| 5,000,398 | A | 3/1991 | Rashev | |
| 9,892,379 | B1* | 2/2018 | Danyluk | .......... G08B 13/19695 |
| 10,395,544 | B1* | 8/2019 | Harris | .................. G08G 5/0069 |
| 2006/0052981 | A1* | 3/2006 | Klein | ..................... G07G 3/003 |
| | | | | 702/173 |
| 2016/0196756 | A1* | 7/2016 | Prakash | ................ G08G 5/025 |
| | | | | 701/3 |
| 2017/0262789 | A1* | 9/2017 | Zhang | .................... G06Q 10/08 |
| 2017/0323257 | A1* | 11/2017 | Cheatham, III | .... G06Q 10/0631 |
| 2018/0003792 | A1* | 1/2018 | McCafferty | ...... G08G 1/096758 |
| 2018/0039286 | A1* | 2/2018 | Tirpak | ..................... B64F 1/00 |
| 2018/0357910 | A1* | 12/2018 | Hobbs | .................... B64C 39/02 |
| 2019/0108472 | A1 | 4/2019 | Sweeney et al. | |
| 2020/0062395 | A1* | 2/2020 | Tsugawa | .............. B64C 39/024 |

* cited by examiner

*Primary Examiner* — Redhwan K Mawari
*Assistant Examiner* — Melanie J Patrick
(74) *Attorney, Agent, or Firm* — Hanley, Flight & Zimmerman, LLC (57) ABSTRACT Delivery landing pads for unmanned aerial vehicles (UAVs) are disclosed. A disclosed landing pad to support a UAV includes a landing surface, and a pressure sensor operatively coupled to the landing surface. The landing pad also includes a processor to determine a presence of the UAV on the landing pad and calculate a weight of a payload transported by the UAV based on a measurement of the pressure sensor to determine whether the payload has been delivered to the landing pad.

18 Claims, 8 Drawing Sheets

DELIVERY LANDING PADS FOR UNMANNED AERIAL VEHICLES (UAVS)

FIELD OF THE DISCLOSURE

This disclosure relates generally to unmanned aerial vehicles (UAVs) and, more particularly, to delivery landing pads for UAVs.

BACKGROUND

In recent years, unmanned aerial vehicles (UAVs) or drones have been used to carry and deliver payloads across significant distances. For example, a UAV can be used to transport payloads (e.g., packages, supplies, equipment, etc.) based on internal and/or external navigational guidance systems. In particular, the UAV can deliver a purchased product to a residence or business without use of ground transportation, which can be subject to traffic conditions and/or limitations on delivery capabilities. However, it can be difficult in known examples to guide the UAV to a precise residential location and confirm delivery of the payload.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Delivery landing pads for unmanned aerial vehicles (UAVs) are disclosed herein. Some UAVs are used to deliver payloads to relatively distant locations without the need for ground transportation. However, in such known examples, delivery of a payload is not often confirmed. In particular, the payload can be lost or fall off a UAV in transit prior to the UAV arriving at a delivery zone. Further, known UAV guidance systems can have difficulty directing navigation of a UAV to a precise residential location.

Examples disclosed herein enable accurate confirmation of UAV payload delivery. In particular, examples disclosed herein can be used to accurately confirm that a correct payload (e.g., an ordered retail product) has been delivered. Examples disclosed herein can also accurately guide navigation of a UAV once the UAV has entered within a zone (e.g., a predetermined range) of a landing pad. Accordingly, examples disclosed herein can be used for precise navigational guidance to a residential location that would otherwise be time consuming or difficult to access, such as an apartment of a residential complex.

Examples disclosed herein utilize a landing pad with a pressure sensor to measure a weight of a UAV (with a payload) or a payload dropped and/or delivered onto the landing pad by the UAV. The example landing pad also includes a processor to determine a presence of the UAV on the landing pad and calculate a weight of the payload based on a measurement of the pressure sensor to determine whether the payload has been successfully delivered to the landing pad. In some examples, the landing pad transmits a unique identifier to the UAV. Additionally or alternatively, the landing pad guides the UAV (e.g., navigationally guides) to a relatively precise residential location, such as an apartment in a building complex, (e.g., the landing pad transmits a location of the landing pad when the UAV is within a predetermined communication range of the landing pad).

In some examples, the landing pad is communicatively coupled to a network interface and/or a network so that the landing pad can transmit a delivery message to a fulfillment center (e.g., a warehouse) indicating that the correct payload has been successfully delivered to the landing pad. In particular, the landing pad can utilize a weight measured by the pressure sensor to verify that a correct product and/or package has been delivered. In some examples, clamps or straps are implemented to restrain the UAV to the landing pad. In some examples, a battery and/or a solar panel are implemented to power the landing pad. In some examples, the landing pad is placed on or proximate a residential balcony (e.g., a high rise balcony, an apartment complex etc.).

Figure 1:
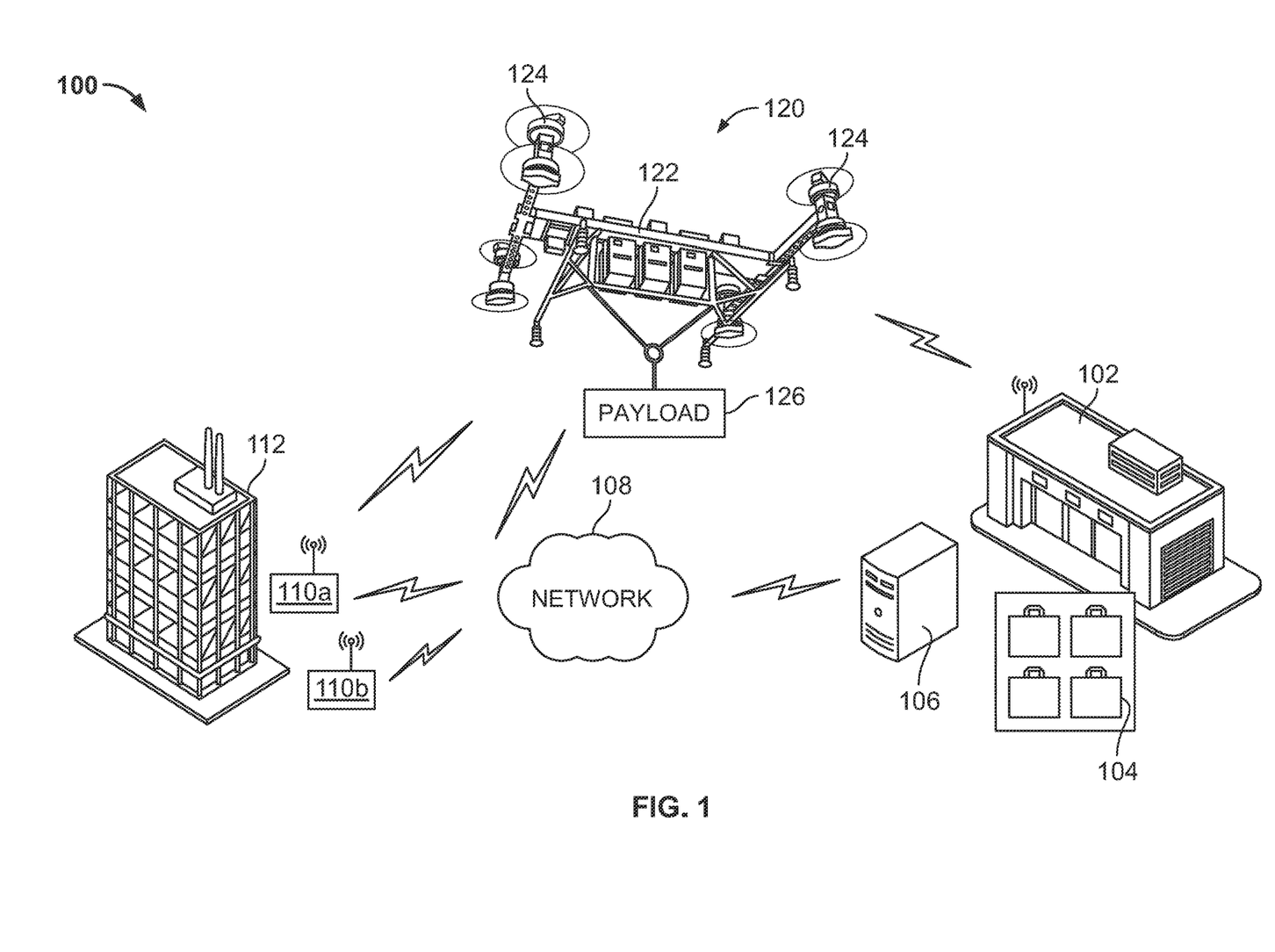
FIG. 1 illustrates an example delivery system in accordance with the teachings of this disclosure.

FIG. 1 illustrates an example delivery system 100 in accordance with the teachings of this disclosure. The delivery system 100 includes a fulfillment center (e.g., a warehouse, a fulfillment warehouse, etc.) 102 that houses products 104. The example fulfillment center 102 also includes an inventory management server 106. According to the illustrated example, a network 108 communicatively couples delivery zones 110 (hereinafter zones 110a, 110b, etc.), which are shown positioned relative to a building 112 (e.g., a residential building, a residential house, a private residence, a commercial building, an industrial facility, etc.). In this example, the delivery zone 110a is located near a window or balcony of the building 112 while the delivery zone 110b is located on the ground proximate the building 112.

As can be seen in the illustrated example of FIG. 1, an unmanned aerial vehicle (UAV) 120, which includes a main body (e.g., a frame, a chassis, etc.) 122 and rotors 124. In this example, the UAV 120 flies between (e.g., back and forth between) the fulfillment center 102 and the building 112 carrying a payload 126 therebetween. In particular, the example UAV 120 carries one or more of the products 104 to be delivered to one of the delivery zones 110a, 110b of the building 112.

According to the illustrated example, the UAV 120 is communicatively coupled to the network 108 and/or the fulfillment center 102 so that the inventory management server 106 directs the UAV 120 to pick up the payload 126 at the fulfillment center 102 and deliver the payload 126 to the building 112 at a corresponding one of the delivery zones 110a, 110b. Further, the inventory management server 106 also manages and tracks the inventory 104 stored in the fulfillment center 102. In this example, once the UAV 120 is within a defined range (e.g., within a communication range) of a corresponding one of the delivery zones 110a, 110b, the UAV 120 is navigationally guided by the corresponding one of the delivery zones 110a, 110b. In particular, the UAV 120 is directed to a final delivery location via a homing signal and/or localized navigational guidance.

In some examples, the delivery zones 110a, 110b are communicatively coupled to the network 108 (e.g., to convey a general position and/or user associations or identification, etc.). In some examples, the UAV 120 is also implemented to process returns. In particular, consumers can place items to be returned to the fulfillment center 102 by placing the items at the delivery zones 110a, 110b (e.g., the UAV 120 picks up return items at the appropriate delivery zones 110a, 110b after a delivery).

While FIG. 1 shows an example network topology and inventory management flow, any appropriate network, data flow and/or communication topology may be implemented instead. For example, the UAV 120 may be directed by the fulfillment center 102 when the UAV 120 is in a proximate range of the fulfillment center 102 and, likewise, the UAV 120 may be navigationally directed by the delivery zones 110a, 110b within a respective communication or navigation range of the delivery zones 110a, 110b.

Figure 2A:
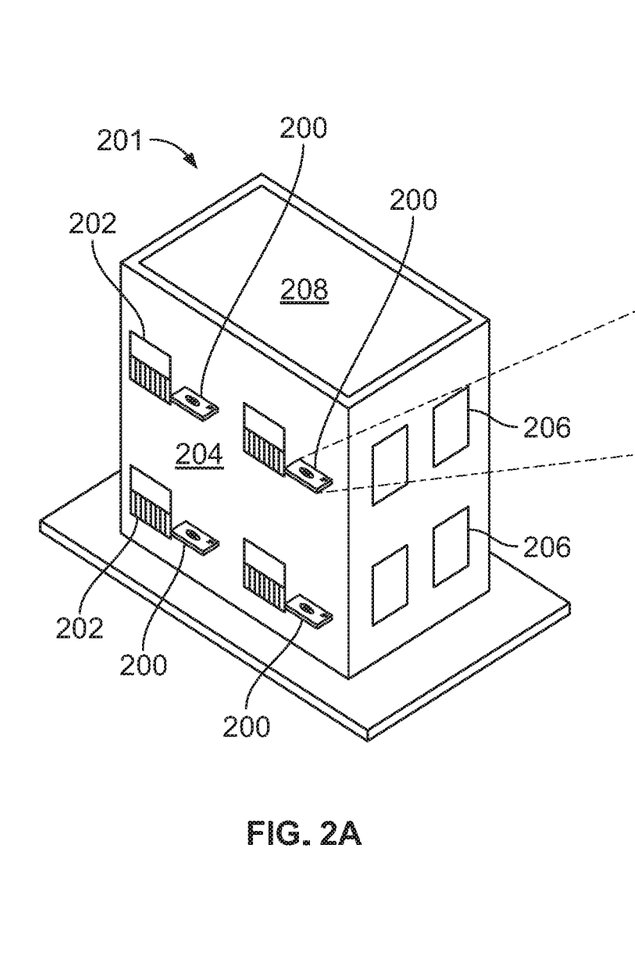
FIG. 2A illustrates example delivery zone placement of examples disclosed herein.

FIG. 2A illustrates example delivery zone placement of examples disclosed herein. According to the illustrated example, multiple landing pads 200 are mounted onto a building (e.g., a residential building, an apartment complex, etc.) 201 having patios 202. In particular, the landing pads 200 are coupled (e.g., mounted, attached, etc.) to a wall 204.

In operation, the landing pads 200 are mounted to the wall 204 to receive products (e.g., ordered retail products) for consumers at corresponding residences of the building 201. In other words, the landing pads 200 receive products ordered by consumers of the building 201 and the products are fulfilled by the fulfillment center 102 shown in FIG. 1. According to the illustrated example, the landing pads 200 verify delivery of the products. In this example, the landing pad 200 to receive a delivery guides the UAV 120 to land thereon when the UAV 120 is within a range thereof (e.g., a communication range, a defined proximity range, etc.).

In other examples, the landing pads 200 are placed onto or adjacent windows 206 instead of the patios 202. Additionally or alternatively, the landing pads 200 are positioned on a roof 208. In some examples, the receiving landing pad 200 transmits a delivery confirmation to a user (e.g., a mobile device or tablet of the user) and/or the inventory management system 106.

Figure 2B:
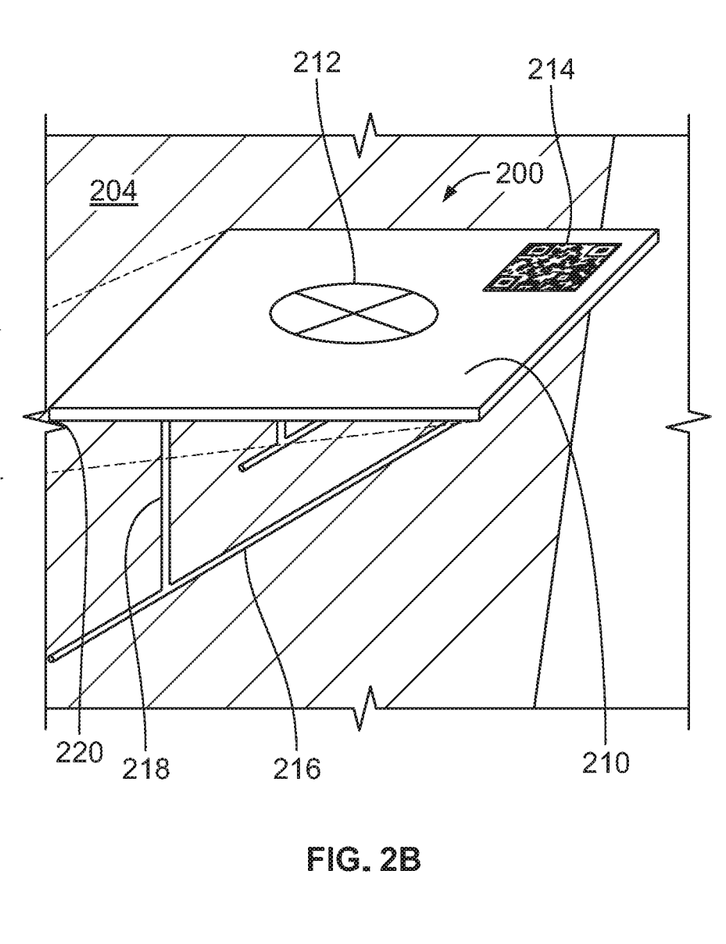
FIG. 2B illustrates an example landing pad in accordance with the teachings of this disclosure.

FIG. 2B illustrates the example landing pad 200 in accordance with the teachings of this disclosure. As can be seen in the illustrated example, the landing pad 200 is fixed to the wall 204 via a wall mount (e.g., a building wall mount, a residential structure wall mount, etc.), which can include fasteners and/or a frame structure. The example landing pad 200 includes a landing surface 210, a landing reticle (e.g., a centering reticle, a target landing reticle, etc.) 212, a visual identifier 214, which is implemented as a quick response (QR) code in this example, a lateral support 216 and a vertical support 218. In some examples, the landing pad 200 includes a rotatable hinge 220.

In some examples, the landing pad 200 rotates relative to the wall 204 about the rotatable hinge 220 to fold the landing pad 200 against or into an opening or surface of the wall 204. In such examples, the lateral support 216 and the vertical support 218 can be rotated relative to one another to allow the landing pad 200 to fold. In other examples, the landing pad 200 can slide into and out of the wall 204. Additionally or alternatively, the landing pad 200 can swivel towards or into the corresponding patio 202 (shown in FIG. 2A).

Figure 3:
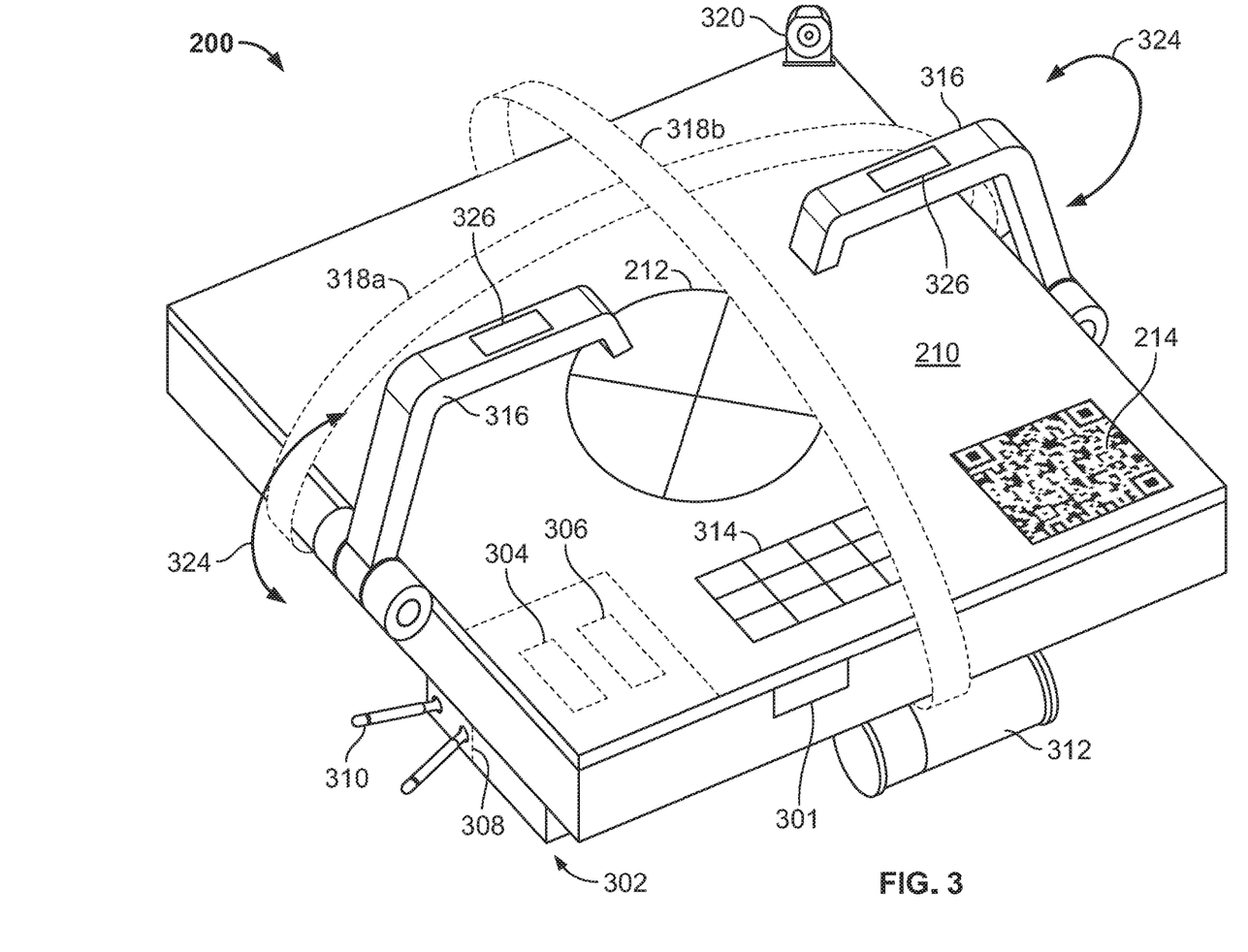
FIG. 3 is a detailed view of the example landing pad of FIG. 2B.

FIG. 3 is a detailed view of the example landing pad 200 shown in FIGS. 2A and 2B. The landing pad 200 of the illustrated example includes the aforementioned landing surface 210, the visual identifier 214, a pressure sensor (e.g., a weight sensor, a scale, etc.) 301 and a landing pad control module 302, which includes control circuitry 304 and, in some examples, a wireless charger (e.g. charging coils, magnetic field generator, a landing pad magnetic field source, etc.) 306. The landing pad control module 302 also includes a transceiver 308 with antennas (e.g., transmit/receive antennas) 310. In some examples, the landing pad 200 also includes a battery (e.g., a battery module, a battery array, a battery assembly, etc.) 312 and a solar panel array 314. In some examples, the landing pad 200 includes rotatable arms (e.g., movable clamps) 316 and/or restraining straps 318 (hereinafter restraining straps 318a, 318b). Additionally or alternatively, the landing pad 200 includes a camera 320.

To enable the UAV 120 to verify that the landing pad 200 is the proper landing site to which products are to be delivered to, the UAV 120 includes a camera and/or image recognition system to verify the visual identifier 214. In other words, the UAV verifies the visual identifier 214 to confirm that the landing pad 200 is the correct delivery landing site. Additionally or alternatively, the transceiver 308 transmits a unique identifier signal that is verified by the UAV 120 and/or the fulfillment center 102.

To determine a presence of the UAV 120 on the landing pad 200, the landing surface 210 of the landing pad 200 is operatively coupled to the pressure sensor 301. Additionally or alternatively, the camera 320 is utilized to determine a presence of the UAV 120 and/or the payload 126 on the landing pad 200. In examples where the camera 320 is implemented, the control circuitry 304 and/or the inventory management server 106 can utilize image recognition technology to determine that the UAV 120 is present on the landing surface 210.

To verify delivery of products onto the landing pad 200 of the illustrated example, the aforementioned pressure sensor 301 provides weight measurements to the control circuitry 304 which, in turn, performs weight calculation(s) to confirm that the proper product was delivered as the payload 126 onto the landing surface 210. In this particular example, the control circuitry 304 takes into account a known weight (e.g., a known weight of the UAV 120 without the payload 126) and a bulk weight measured by the pressure sensor 301 at the landing surface 210 to calculate a weight of the payload 126. Accordingly, the control circuitry 304 and/or the inventory management system 106 compare the calculated weight to an expected weight of the payload 126 (e.g., an expected product or package delivery weight) to verify that the proper product has been delivered to the landing pad 200. In particular, the calculated weight is compared to an expected weight of the product or a database of expected product weights. In some examples, the payload 126 includes multiple products to be delivered to different residences. Accordingly, in such examples, partial weight calculations of the payload 126 are performed to account for multiple product deliveries.

To secure the UAV 120 and/or the payload 126 to the landing pad 200, the landing pad 200 includes the rotatable arms 316 in some examples. In some such examples, the rotatable arms 316 can rotate along directions generally indicated by respective double arrows 324 once the UAV 120 lands on the landing surface 210. In other examples, the straps 318a, 318b are used to restrain or secure the UAV 120 and/or the payload 126. In some examples, the straps 318a, 318b are actuated to secure the UAV 120 and/or the payload 126. In particular, the straps 318a, 318b can be used to secure a portion (e.g., landing legs, a retention hook, etc.) of the UAV 120, for example.

In some examples, the UAV 120 is guided to the landing pad 200 by the control circuitry 304 via the transceiver 308. For example, the transceiver 308 can transmit a homing signal, location data and/or landing coordinates to the UAV 120 when the UAV 120 reaches a threshold range of the transceiver 308 and/or the landing pad 200. In such examples, the fulfillment center 102 can direct the UAV 120 to a general area of the landing pad 200 prior to the control circuitry 304 of the landing pad 200 guiding the UAV 120 to the landing surface 210 when the UAV 120 is within the threshold range. Additionally or alternatively, the UAV 120 utilizes the landing reticle 212 to land onto the landing surface 210.

In some examples, the UAV 120 is charged (e.g., wirelessly charged) by the wireless charger 306. In particular, batteries of the UAV 120 can be charged for the return trip to the fulfillment center 102 or another delivery location for a subsequent product delivery. In some examples, the solar panel array 314 is used to power the landing pad control module 302, the control circuitry 304, and/or the wireless charger 306. Additionally or alternatively, the battery 312 is charged by the solar panel array 314.

In some examples, charging coils 326 are disposed on or within the rotatable arms 316. In some examples, the landing surface 210 and/or the landing pad 200 are implemented as a fabric (e.g., a weather resistant fabric) that is foldable. In other examples, the landing surface 210 and/or the landing pad 200 are at least partially composed of aluminum or any other appropriate material.

Figure 4:
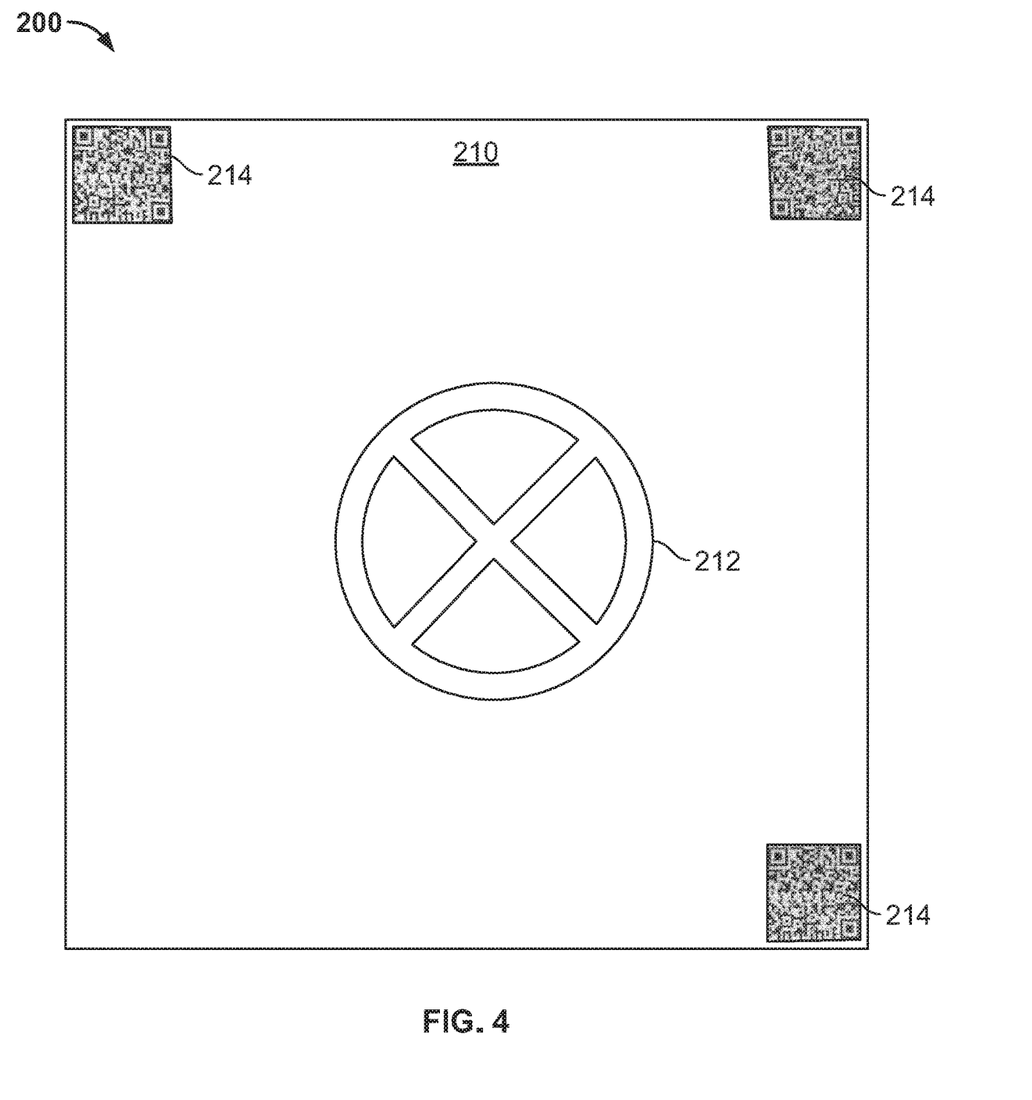
FIG. 4 illustrates example visual identifiers that can be implemented in examples disclosed herein.

FIG. 4 illustrates example visual identifiers that can be implemented in examples disclosed herein. According to the view of FIG. 4, the landing surface 210 is shown with the landing reticle 212 and multiple visual identifiers 214. In this example, the landing reticle 212 is centered on the landing surface 210.

According to the illustrated example, the landing reticle 212 is used by the UAV 120 to align the UAV 120 to the landing pad 200 during landing while the visual identifiers 214 are used by the UAV 120 to verify the corresponding landing pad 200 (e.g., verify that the landing pad 200 corresponds to a specific user or consumer). In other examples, a relative positioning of the visual identifiers 214 is used to align the UAV 120 during landing and also to identify the landing pad 200 (e.g., a center position of the landing surface 210 is determined based on relative positions of multiple ones of the visual identifiers 214).

Figure 5:
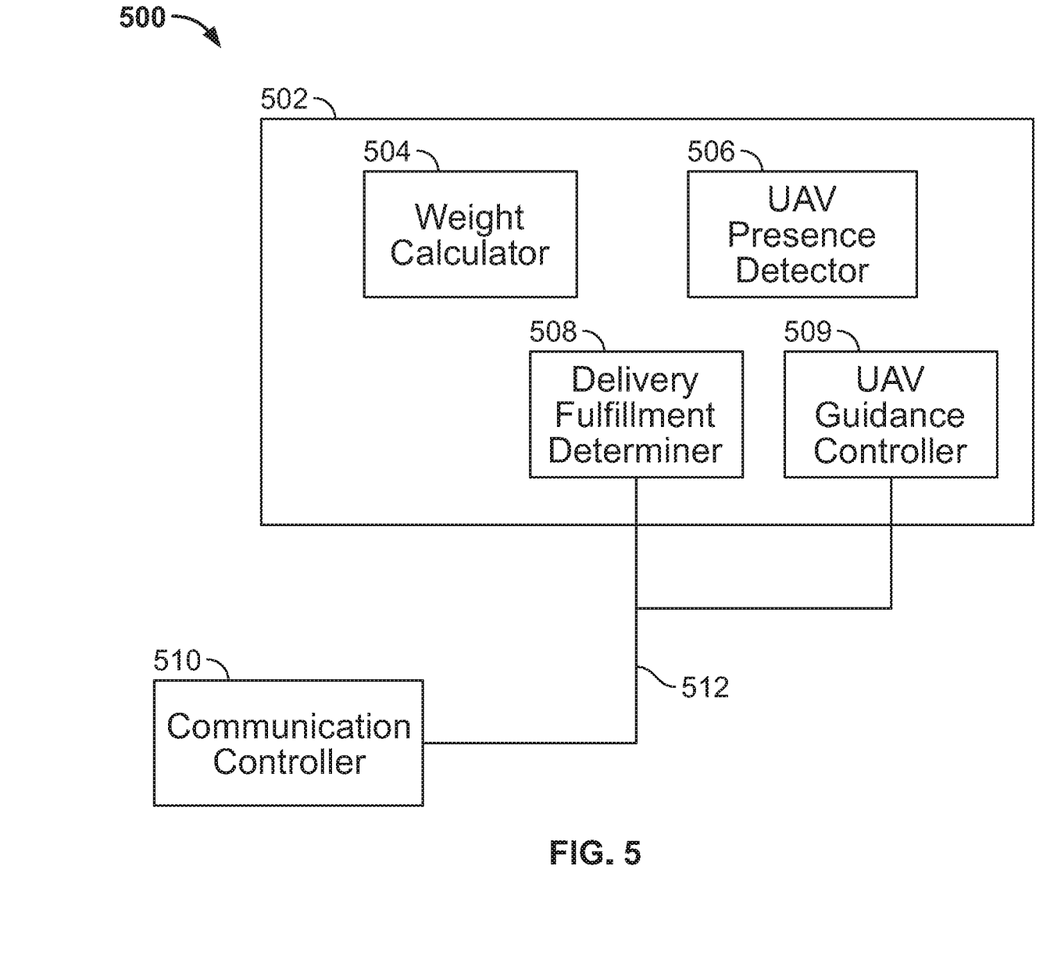
FIG. 5 is schematic overview of an example unmanned aerial vehicle (UAV) delivery control system.

FIG. 5 is schematic overview of an example unmanned aerial vehicle (UAV) delivery control system 500. The UAV delivery control system 500 can be implemented on the control circuitry 304 and/or the inventory management system 106. The UAV delivery control system 500 of the illustrated example includes a UAV analyzer 502, which includes a weight calculator 504, a UAV presence detector 506, a delivery fulfillment determiner 508 and a UAV guidance controller 509. In this example, the UAV delivery control system 500 also includes a communication controller 510, which is communicatively coupled to the delivery fulfillment determiner 508 and the UAV guidance controller 509 via a communication line 512. In some examples, the communication controller 510 is communicatively coupled to the network 108 via a wireless network (e.g., Wi-Fi network) associated with a residence.

The example UAV presence detector 506 determines a presence of the UAV 120 on the landing pad 200. In this example, the UAV presence detector 506 utilizes the pressure sensor 301 associated with the landing surface 210. Additionally or alternatively, the UAV presence detector 506 utilizes the camera 320 to determine a presence of the UAV 120.

According to the illustrated example, to confirm a payload delivery to the landing pad 200, the weight calculator 504 calculates a payload weight based on a known weight of the UAV 120. In turn, the example delivery fulfillment determiner 508 compares the calculated payload weight to an expected weight (e.g., an expected weight of an ordered product) to confirm that the correct delivery occurred to the landing pad 200. In some examples, the weight calculator 504 takes into account weights of products in the payload 126 that are for subsequent deliveries by the UAV 120.

In some examples, the UAV guidance controller 509 is used to guide navigation and/or landing of the UAV 120 onto the landing pad 200. In particular, the UAV guidance controller 509 can direct the UAV 120 when the UAV 120 has come within a threshold range of the landing pad 200. In particular, the example UAV guidance controller 509 controls or guides movement of the UAV 120 when the UAV 120 is within transmission range of the transceiver 308. In other examples, the UAV 120 utilizes the target reticle 212 when the UAV 120 is within a range (e.g., a visual range, a threshold range, etc.) of the landing pad 200.

The communication controller 510 of the illustrated example controls communication between the transceiver 308 with the network 108, the fulfillment center 102 and/or the UAV 120. In some examples, the communication controller 510 determines whether the UAV 120 is within communication range of the transceiver 308, thereby enabling localized navigational control of the UAV 120.

While an example manner of implementing the UAV delivery control system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example weight detector 504, the example UAV presence detector 506, the example delivery fulfillment determiner 508, the example UAV guidance controller 509, the example communication controller 510 and/or, more generally, the example UAV delivery control system 500 of FIG. 5 may be implemented by hardware, software, firmware and/or any combination of hardware, software and/or firmware. Thus, for example, any of the example weight detector 504, the example UAV presence detector 506, the example delivery fulfillment determiner 508, the example UAV guidance controller 509, the example communication controller 510 and/or, more generally, the example UAV delivery control system 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example weight detector 504, the example UAV presence detector 506, the example delivery fulfillment determiner 508, the example UAV guidance controller 509, and/or the example communication controller 510 is/are hereby expressly defined to include a non-transitory computer readable storage device or storage disk such as a memory, a digital versatile disk (DVD), a compact disk (CD), a Blu-ray disk, etc. including the software and/or firmware. Further still, the example UAV delivery control system 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
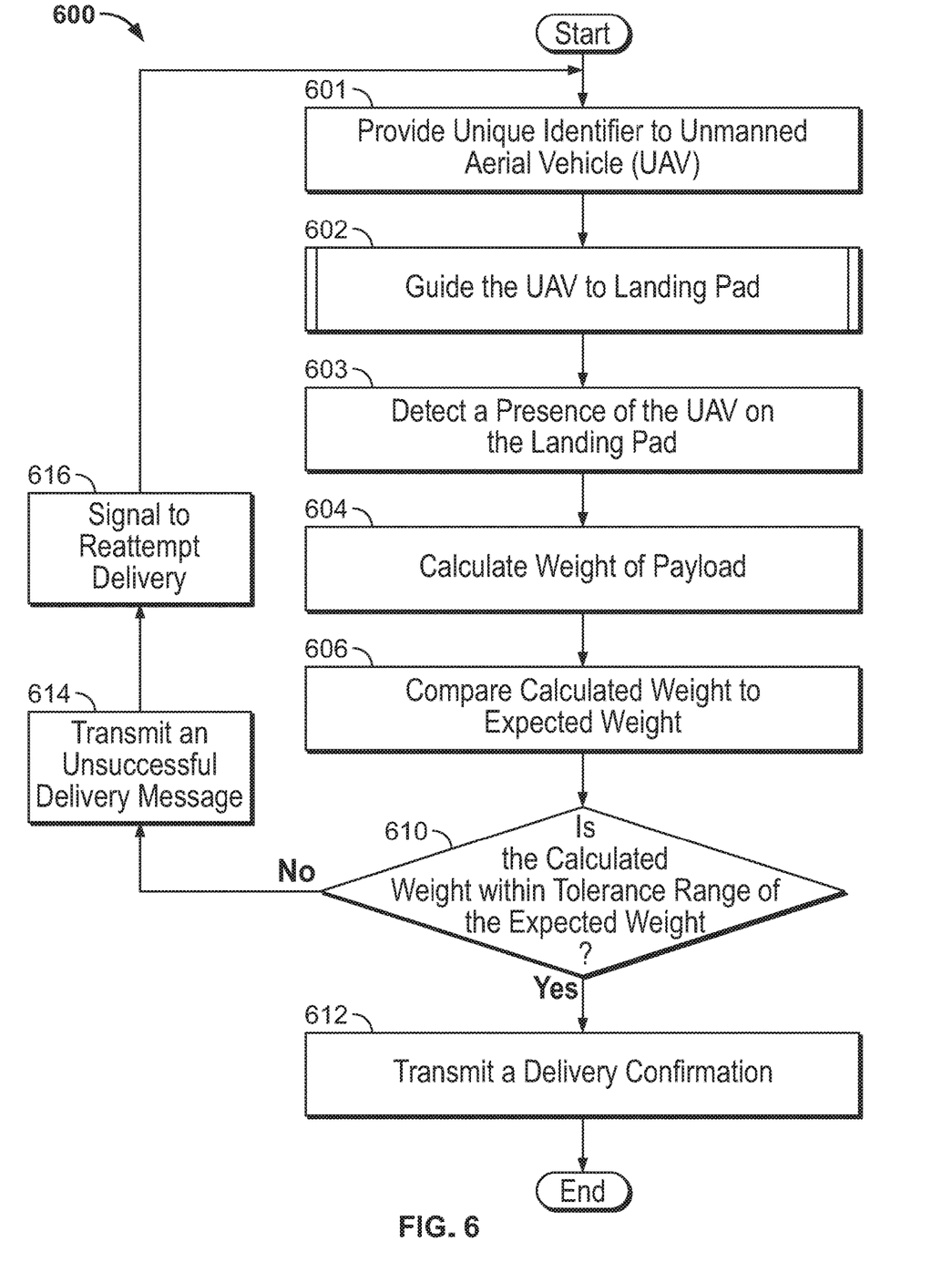
FIG. 6 is a flowchart representative of machine readable instructions that may be executed to implement examples disclosed herein.
Figure 7:
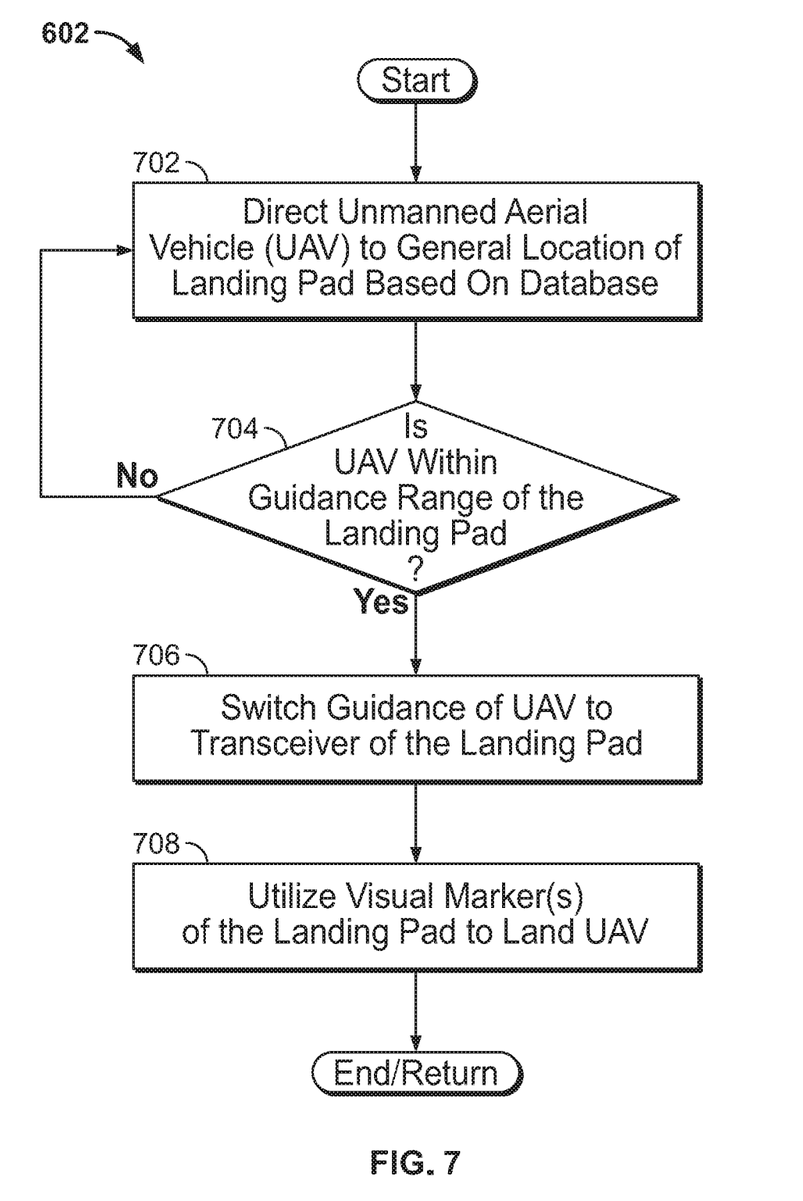
FIG. 7 is a flowchart representative of machine readable instructions that may be executed to implement a subroutine of FIG. 6.

Flowcharts representative of example hardware logic, machine readable instructions, hardware implemented state machines, and/or any combination thereof for implementing the UAV delivery control system 500 of FIG. 5 are shown in FIGS. 6 and 7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example UAV delivery control system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example method 600 is shown in FIG. 6. The example method 600 begins as the UAV 120 is carrying the payload 126 from the fulfillment center 102 shown in FIG. 1. In this example, the payload 126 includes a product to be delivered to the landing pad 200.

In this example, a unique identifier of the landing pad 200 is provided (e.g., transmitted) to the UAV 120 (block 601). In particular, the example fulfillment center 102 transmits the unique identifier of the landing pad 200 to the UAV 120. In some examples, a location (e.g., a delivery zone, a general area, etc.) of the landing pad 200 is also transmitted to the UAV 120 by the fulfillment center 102.

According to the illustrated example, the UAV guidance controller 509 guides the UAV 120 to the landing pad 200 (block 602). In this example, once the UAV 120 is guided towards the landing pad 200, the unique identifier associated with the landing pad 200 is confirmed by the UAV presence detector 506. In some examples, the unique identifier is confirmed during flight of the UAV 120 (e.g., when the UAV 120 is within a landing range).

The weight calculator 504 and/or the UAV presence detector 506 detect a presence of the UAV 120 on the landing pad 200 (block 603). In this example, the pressure sensor 301 is used to determine the presence of the UAV 120.

The weight calculator 504 of the illustrated example calculates a weight of the payload 126 (block 604). In this example, the weight calculator 504 utilizes a known weight of the UAV 120 to calculate a weight of the payload 126 and, in turn, a weight of a product or package placed onto the landing pad 200 by the UAV 120. In some examples, a weight of non-delivered product(s) (e.g., products for subsequent deliveries) carried by the UAV 120 is taken into account in the calculation.

In this example, the delivery fulfillment determiner 508 compares the calculated weight of the payload 126 to an expected weight (block 606). In particular, the delivery fulfillment determiner 508 compares the calculated weight to a known expected product weight (or an expected weight of multiple products delivered) to confirm that a proper product and/or package has been delivered.

It is then determined by the product fulfillment determiner 508 whether the calculated weight is within a tolerance range of an expected weight (block 610). If the calculated weight is within the tolerance range, a delivery confirmation is transmitted by the communication controller 510 to the fulfillment center 102 and/or the inventory management system 106 (block 612) and the process ends. Otherwise, control of the process proceeds to block 614. In some examples, delivery confirmation is sent to a user's personal network (e.g., email or notifications) via the network 108.

At block 614, the example communication controller 510 transmits a non-delivery message to the fulfillment center 102 and/or the inventory management system 106.

In some examples, if the delivery to the landing pad 200 is unsuccessful, the communication controller 510 and/or the fulfillment center 102 signal the UAV 120 or another UAV to reattempted delivery to the landing pad 200 (block 616) and control of the process returns to block 602.

FIG. 7 is a flowchart representative of the example subroutine 602 of FIG. 6. In this example, the UAV 120 is being directed towards the landing pad 200.

According to the illustrated example, the fulfillment center 102 directs the UAV 120 towards a general location of the landing pad 200 based on a database (e.g., a locational or address database) of the inventory management system 106 (block 702). In some examples, the UAV guidance controller 509 directs an initial movement of the UAV 120 towards a general zone of the landing pad 200. In some examples, the landing pad 200 transmits its location to the fulfillment center 102 via the network 108 to define a general location of the landing pad 200 that is subsequently transmitted to the UAV 120.

In this example, the inventory management system 106, the communication controller 510 and/or the transceiver 308 determine whether the UAV 120 is within a guidance range of the landing pad 200 (block 704). If the UAV 120 is not within the guidance range (block 704), control of the process returns to block 702. Otherwise, control of the process proceeds to block 706. In some examples, a geolocation determination (e.g., a GPS position) of the UAV 120 is utilized in this determination. Additionally or alternatively, a signal strength measured by the UAV 120 and/or the transceiver 308 is used in this determination. In some examples, a time of arrival estimate is used to switch the UAV 120 to be precisely guided by the landing pad 200.

At block 706, guidance and/or navigation of the UAV 120 is switched to the transceiver 308 of the landing pad 200.

Additionally or alternatively, in some examples, the UAV 120 utilizes visual markers, such as the landing reticle 212, the visual indicator(s) 214, or a homing signal transmitted from the transceiver 308 to land the UAV 120 onto the landing pad 200 (block 708) and the process ends/returns.

Figure 8:
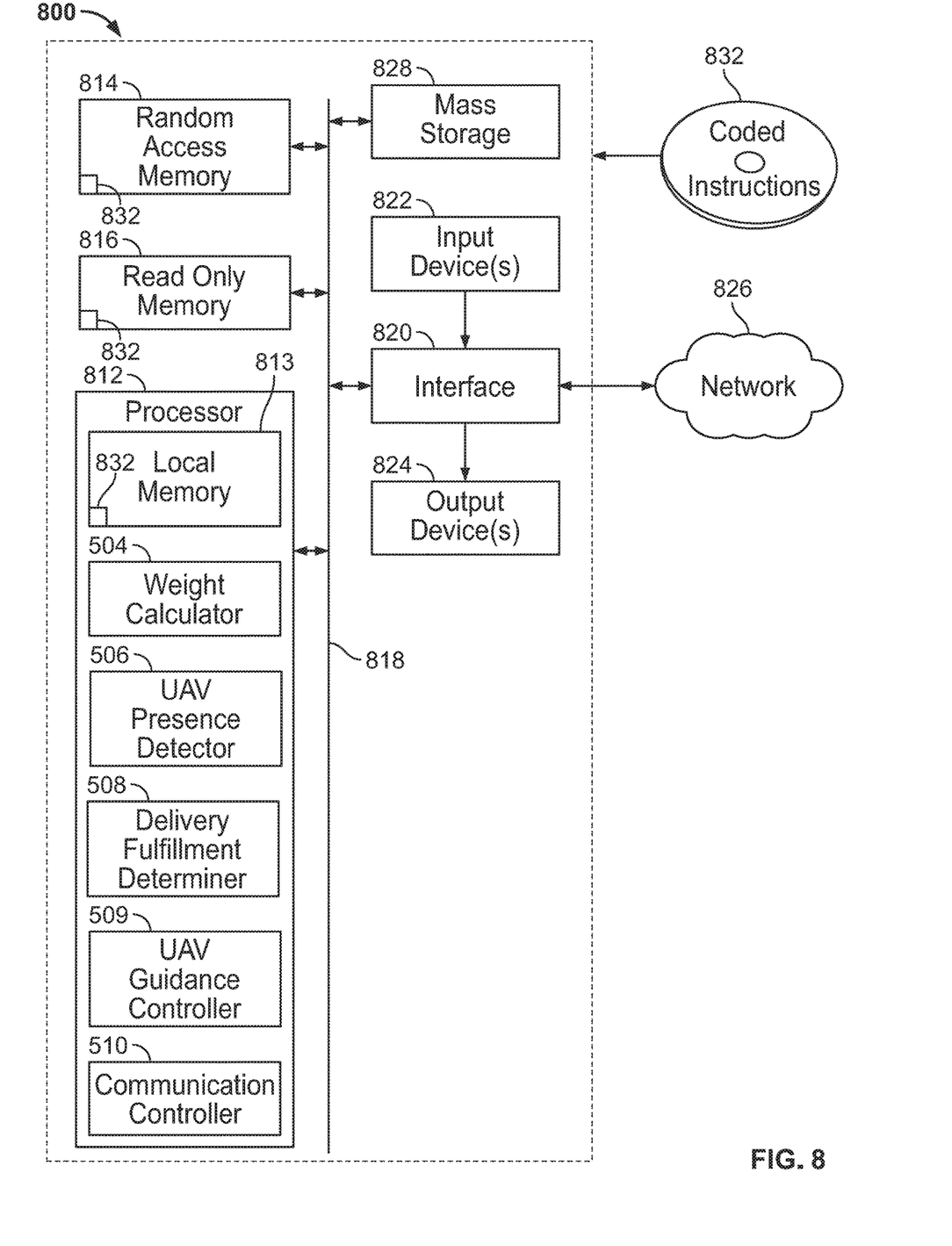
FIG. 8 is a block diagram of an example processing platform structured to execute the instructions of FIGS. 6 and 7 and/or to implement the example UAV delivery control system of FIG. 5.

FIG. 8 is a block diagram of an example processor platform 800 structured to execute the instructions of FIGS. 6 and 7 to implement the UAV delivery control system 500 of FIG. 5. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example weight calculator 504, the example UAV presence detector 506, the example delivery fulfillment determiner 508, the example UAV guidance controller 509 and the example communication controller 510.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable efficient automated delivery of products to consumers via UAVs. Examples disclosed herein enable accurate delivery and delivery confirmation of products and/or packages to consumers in residential or commercial zones (e.g., residential or commercial high-rises) that can be otherwise difficult to deliver to.

Example 1 includes a landing pad to support a UAV that includes a landing surface, and a pressure sensor operatively coupled to the landing surface. The landing pad also includes a processor to determine a presence of the UAV on the landing pad and calculate a weight of a payload transported by the UAV based on a measurement of the pressure sensor to determine whether the payload has been delivered to the landing pad.

Example 2 includes the landing pad of Example 1, and further includes a transceiver to transmit a unique identifier to the UAV, and where the transceiver is to transmit a delivery message to a fulfillment center when the processor determines that the payload has been delivered to the landing pad.

Example 3 includes the landing pad of Example 2, where the transceiver is to transmit a position of the landing pad to the UAV or a fulfillment center.

Example 4 includes the landing pad of Example 1, and further includes a wall mount, where the wall mount is to be coupled to an exterior wall of a building.

Example 5 includes the landing pad of Example 1, and further includes a rotatable clamp to restrain the UAV.

Example 6 includes the landing pad of Example 1, and further includes a battery and a solar panel.

Example 7 includes the landing pad of Example 1, where the landing pad is foldable against an exterior wall of a building.

Example 8 includes the landing pad of Example 1, where the landing pad includes a landing reticle and a quick response (QR) code.

Example 9 includes a method to confirm a delivery of a payload carried by an unmanned aerial vehicle (UAV) to a landing pad, where the method includes detecting a presence of the UAV on the landing pad, measuring, via a pressure sensor, a weight of the UAV and a payload carried by the UAV, calculating, by instructions executed with a processor, a weight of the payload, and comparing, by instructions executed with a processor, the weight of the payload with an expected weight of the payload to confirm delivery of the payload to the landing pad.

Example 10 includes the method of Example 9, and further includes transmitting, by instructions executed with a processor, a delivery confirmation to a fulfillment center upon verifying that the calculated weight of the payload is within a tolerance range of an expected weight.

Example 11 includes the method of Example 9, and further includes guiding, by instructions executed with a processor of the landing pad, the UAV to the landing pad.

Example 12 includes the method of Example 11, and further includes transmitting a location and a unique identifier of the landing pad to the UAV when the UAV is within a range of the landing pad.

Example 13 includes the method of Example 12, where the UAV is to compare the unique identifier with a unique identifier provided by a fulfillment center to verify the landing pad.

Example 14 includes the method of Example 9, where the comparing the calculated weight of the payload to the expected weight is based on weights of packages for subsequent deliveries.

Example 15 includes the method of Example 9, and further includes operating a clamp to restrain the UAV relative to the landing pad.

Example 16 includes the method of Example 9, and further includes charging the UAV via a magnetic field generated by the landing pad.

Example 17 includes an tangible machine readable medium comprising instructions, which when executed, cause a processor to at least calculate a weight of a payload delivered by an unmanned aerial vehicle (UAV) to a landing pad based on a pressure sensor measurement of the landing pad, compare the weight of the payload with an expected weight of the payload to confirm delivery of the payload to the landing pad, and determine a delivery status of the payload based on the comparison of the calculated weight with the expected weight.

Example 18 includes the tangible machine readable medium of Example 17, where the instructions cause the processor to determine that the UAV has entered a zone of the landing pad, and cause the UAV to enter a mode in which the UAV is guided to the landing pad based on signals transmitted from the landing pad.

Example 19 includes the tangible machine readable medium of Example 17, where the instructions cause the processor to cause clamps to restrain the UAV to the landing pad.

Example 20 includes the tangible machine readable medium of Example 17, where the instructions cause the processor to direct a transceiver to transmit a unique identifier of the landing pad to the UAV, and wherein the processor is to verify that the UAV is landing at a correct location based on the unique identifier.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of residential order deliveries, examples disclosed herein can be applied to any UAV delivery system including commercial or industrial delivery systems, etc.

What is claimed is:

1. A method to confirm a delivery of a payload carried by an unmanned aerial vehicle (UAV) to a landing pad, the method comprising:
   guiding, by instructions executed with at least one processor, the UAV to the landing pad positioned proximate a window or balcony of a building;
   causing the landing pad to slide out or fold out from an outer wall of the building, wherein causing the landing pad to fold out or slide out incudes moving a vertical support and a horizontal support of the landing pad, the vertical support and the horizontal support to be rotated relative to one another to fold the landing pad away from the our wall;
   detecting a presence of the UAV on the landing pad;
   measuring, via a pressure sensor, a weight of the UAV and a payload carried by the UAV;
   calculating, by instructions executed with the at least one processor, a weight of the payload; and
   comparing, by instructions executed with the at least one processor, the weight of the payload with an expected weight of the payload to confirm delivery of the payload to the landing pad.

2. The method as defined in claim 1, further including transmitting, by instructions executed with the at least one processor, a delivery confirmation to a fulfillment center upon verifying that the calculated weight of the payload is within a tolerance range of the expected weight.

3. The method as defined in claim 1, further including transmitting a location and a unique identifier of the landing pad to the UAV when the UAV is within a range of the landing pad.

4. The method as defined in claim 3, wherein the UAV is to compare the unique identifier with a unique identifier provided by a fulfillment center to verify the landing pad.

5. The method as defined in claim 1, wherein the comparing the calculated weight of the payload to the expected weight is based on weights of packages for subsequent deliveries.

6. The method as defined in claim 1, further including operating a clamp to restrain the UAV relative to the landing pad.

7. The method as defined in claim 6, further including charging the UAV via a wireless charger of the clamp.

8. The method as defined in claim 7, wherein charging the UAV includes wireless charging the UAV via a coil disposed in the clamp.

9. The method as defined in claim 8, wherein the coil is positioned proximate a distal end of the clamp.

10. The method as defined in claim 1, further including charging the UAV via a magnetic field generated by the landing pad.

11. The method as defined in claim 1, wherein the landing pad is to be folded away from the outer wall and toward a patio.

12. The method as defined in claim 1, further including placing the UAV within a strap to retain the UAV.

13. The method as defined in claim 12, further including tightening the strap.

14. The method as defined in claim 1, wherein causing the landing pad to fold out or slide out includes rotating the landing pad about a hinge of the outer wall or a patio.

15. A non-transitory machine readable medium comparing instructions, which when executed, cause at least one processor to at least:

guide an unmanned aerial vehicle (UAV) toward a landing pad positioned proximate a window or balcony of a building;

cause the landing pad to fold out or slide out from an outer wall of the building, wherein to cause the landing pad to fold out or slide out incudes moving a vertical support and a horizontal support of the landing pad, the vertical support and the horizontal support to be rotated relative to one another to fold the landing pad away from the our wall;

calculate a weight of a payload delivered by the UAV to the landing pad based on a pressure sensor measurement of the landing pad;

compare the weight of the payload with an expected weight of the payload to confirm delivery of the payload to the landing pad; and determine a delivery status of the payload based on the comparison of the calculated weight with the expected weight.

16. The non-transitory machine readable medium as defined in claim 15, wherein the instructions cause the at least one processor to:

determine that the UAV has entered a zone of the landing pad; and cause the UAV to enter a mode in which the UAV is guided to the landing pad based on signals transmitted from the landing pad.

17. The non-transitory machine readable medium as defined in claim 15, wherein the instructions cause the at least one processor to cause clamps to restrain the UAV to the landing pad.

18. The non-transitory machine readable medium as defined in claim 15, wherein the instructions cause the at least one processor to direct a transceiver to transmit a unique identifier of the landing pad to the UAV, and wherein the processor is to verify that the UAV is landing at a correct location based on the unique identifier.

* * * * *

UNITED STATES PATENT AND TRADEMARK OFFICE
CERTIFICATE OF CORRECTION

PATENT NO. : 10,960,988 B2
APPLICATION NO. : 16/036488
DATED : March 30, 2021
INVENTOR(S) : James Kendall Walker Page 1 of 1

It is certified that error appears in the above-identified patent and that said Letters Patent is hereby corrected as shown below:

In the Claims

Column 12, Line 53, Claim 1, "our" should be --outer--

Column 14, Line 9, Claim 15, "our" should be --outer--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*